US007175206B2

(12) United States Patent
Trantoul

(10) Patent No.: US 7,175,206 B2
(45) Date of Patent: Feb. 13, 2007

(54) ANTI-COUNTERFEITING MARKER FOR AFFIXING VARIABLE ENTRIES ON A SUPPORT TO BE MARKED, METHOD AND RESULTING MARK

(76) Inventor: Francois Trantoul, 1312, Chemin Du Pont Des Anes, Lunel (FR) F-34400

( * ) Notice: Subject to any disclaimer, the term of this patent is extended or adjusted under 35 U.S.C. 154(b) by 500 days.

(21) Appl. No.: 10/490,284

(22) PCT Filed: Aug. 27, 2002

(86) PCT No.: PCT/FR02/02938

§ 371 (c)(1),
(2), (4) Date: Mar. 22, 2004

(87) PCT Pub. No.: WO03/036595

PCT Pub. Date: May 1, 2003

(65) Prior Publication Data

US 2004/0245763 A1 Dec. 9, 2004

(30) Foreign Application Priority Data

Sep. 21, 2001 (FR) .................................. 01 12267

(51) Int. Cl.
*B42D 15/00* (2006.01)
*B32B 9/00* (2006.01)

(52) U.S. Cl. ........................ 283/91; 283/110; 283/904; 428/916

(58) Field of Classification Search .................. 283/91, 283/110, 904; 156/277; 428/916; 235/487, 235/488; 359/19
See application file for complete search history.

(56) References Cited

U.S. PATENT DOCUMENTS

| | | | | |
|---|---|---|---|---|
| 4,006,050 | A | | 2/1977 | Hurst et al. |
| 4,097,279 | A | | 6/1978 | Whitehead |
| 4,469,725 | A | * | 9/1984 | Fischer et al. ................ 428/13 |
| 4,511,908 | A | | 4/1985 | Small |
| 4,684,795 | A | * | 8/1987 | Colgate, Jr. ................. 235/457 |
| 4,748,452 | A | * | 5/1988 | Maurer ........................ 347/224 |
| 4,968,063 | A | | 11/1990 | McConville et al. |
| 5,232,527 | A | | 8/1993 | Vernhet et al. |

(Continued)

FOREIGN PATENT DOCUMENTS

EP 0 271 941 9/1990

(Continued)

*Primary Examiner*—Willmon Fridie, Jr.
(74) *Attorney, Agent, or Firm*—Young & Thompson

(57) ABSTRACT

The invention concerns an anti-counterfeiting marker for providing variable entries (19) and for fixing them on a support (18) to be marked comprising: a sheet-like core (1) having at least a first colored effect (21), visible when illuminated by a predetermined light, and on the reverse side of the core (1), a brittle thickness (3) having a printing surface (4) designed to be damaged and peeled off the core (1) when scratched or erased in an attempt to counterfeit the variable entries (19), and including at least a second coloured effect (22) visible on the side of the printing surface (4) at least when illuminated by said predetermined light, and designed, by combination with the first colored effect (21), to produce a third colored effect (23). The invention also concerns the method for using such a marker and to the resulting marked medium.

33 Claims, 2 Drawing Sheets

U.S. PATENT DOCUMENTS

| | | | | |
|---|---|---|---|---|
| 5,772,248 | A * | 6/1998 | Phillips | 283/91 |
| 6,179,338 | B1 * | 1/2001 | Bergmann et al. | 283/86 |

FOREIGN PATENT DOCUMENTS

| | | |
|---|---|---|
| FR | 2 675 742 | 10/1992 |
| WO | WO 96/32256 | 10/1996 |
| WO | WO 98/54001 | 12/1998 |
| WO | WO 00/24587 | 5/2000 |
| WO | WO 00/71361 | 11/2000 |

* cited by examiner

ANTI-COUNTERFEITING MARKER FOR AFFIXING VARIABLE ENTRIES ON A SUPPORT TO BE MARKED, METHOD AND RESULTING MARK

FIELD OF THE INVENTION

The invention relates to an anti-counterfeiting marker for producing variable entries and for affixing same on a support to be marked while preventing falsification of the entries.

BACKGROUND OF THE INVENTION

The invention extends to a method for affixing variable entries by means of such a marker and a resulting marked support.

In many applications it is necessary to be able to mark supports such as documents (official documents such as passports, identity cards, other identification documents, driving licences, vehicle licensing documents, diplomas, administrative and/or authentication certificates, bank cards, etc.) or objects (luxury articles, vehicles, etc.) with entries, called variable entries, (statement of names, forenames, addresses, numbers, dates, photographs, etc., and/or any other sign, text or image) particular to each support and/or its use and/or its owner or recipient, which entries must remain authentic and must therefore be protected as far as possible against attempted counterfeiting. One of the most typical applications relates to the production and affixing of visas on passports.

To protect the variable entries against attempted counterfeiting, the solution envisaged up to now consists in using a transparent protective security film (for example, EP-0271 941 or U.S. Pat. No. 5,232,527) covering the variable entries which are produced directly on the support to be marked. Such a solution necessitates several operations (production of entries, then gluing of film) and is lengthy and expensive.

To facilitate the production of variable entries (in particular when direct printing on the support is difficult to achieve), films (U.S. Pat. No. 4,968,063) or sheets (WO-98 54 001; WO-96 32256, U.S. Pat. No. 4,006,050) which facilitate these operations and also allow the entries to be finally protected by a protective film has been proposed. The solutions of U.S. Pat. No. 4,968,063, WO-9632256, U.S. Pat. No. 4,006,050 necessitate heavy industrial facilities to produce entries in vitrophany (image inverted as when viewed in a mirror) and hot-bonding of the film. That of WO-98 54001 also requires several operations and several costly products.

It is therefore a general object of the invention to mitigate these disadvantages by proposing a solution which enables variable entries to be produced and affixed easily regardless of the support to be marked (in particular, including the case when the direct production of variable entries on the support is difficult or impossible); effectively to protect variable entries against attempted counterfeiting; and to do so simply and quickly and at lower cost than the above-mentioned previous solutions.

In particular, it is an object of the invention to enable variable entries to be produced in their normal reading orientation and not mirror-inverted.

It is also an object of the invention to enable entries to be produced using various production methods at the user's choice, including handwriting, typewriting, printing with a dot-matrix printer, printing with a laser printer (colour or monochrome), or with a dry ink transfer printer, or by gluing on pre-printed image(s) or photograph(s), etc.

It should be noted that, for the same type of support to be marked, the manner of producing variable entries is often variable and impossible to know in advance. It depends, in particular, on the equipment of the user (who produces the variable entries). For example, different local authorities of the same state are not all provided with the same equipment and the acquisition of costly specific devices for issuing official documents (passports, visas, identity cards, driving licences, etc.) is not justified economically. It is therefore necessary to be able to produce variable entries having the same level of protection (which must, in particular, be uniform for all official documents of the same type of the same state) but using different methods of writing or printing.

To achieve these objects, the invention relates to an anti-counterfeiting marker for producing variable entries and affixing same on a support to be marked while preventing their counterfeiting, comprising:

- a sheet-like core having at least one coloured effect, called the first coloured effect, which is visible on at least one side, called the front or recto side (hereinafter front side), at least when illuminated by predetermined light, and designed to be non-removable by scratching or erasing on the front side of the core without causing visible and irreversible damage to the core;
- a thickness, called the brittle thickness, covering at least a part of the core on the front side, said brittle thickness:
  - having a free surface called the printing surface which is designed to receive variable entries, said brittle thickness being adapted to allow the production of such variable entries on the printing surface without being damaged or becoming detached from the core;
  - being designed to be damaged and to become detached from the core when scratched or erased in an attempt to falsify the variable entries;
  - including at least one coloured effect, called the second coloured effect, at least opposite at least one first, subjacent coloured effect and visible on the side of the printing face at least when illuminated by said predetermined light and designed, by combination with the first coloured effect, to produce a third coloured effect distinct from the first and second coloured effects, and
  - being at least partially transparent, at least when illuminated by said predetermined light, to at least each component of said predetermined light which enables the production of each first coloured effect and of each second coloured effect produced below the printing surface, and to radiation emitted by said coloured effects, to enable each third coloured effect to be displayed.

Thus, the display of the third coloured effect guarantees that the brittle thickness has not been scratched or erased for the purpose of falsifying the variable entries carried thereby. In case of scratching or erasure the second and third coloured effects disappear or are perceptibly modified as a result of the local removal of the brittle thickness. In addition, since a forger cannot accurately know the type and exact dosage of the pigments which enable the second coloured effect to be obtained, said forger cannot reliably reproduce locally the initial third coloured effect by scratching without this being apparent, even if he succeeds in reproducing the damaged portion of brittle thickness and, approximately, the second coloured effect. In fact, even the approximate production of a third coloured effect by a combination of colours requires that the first and second coloured effects be produced with extreme accuracy.

A marker according to the invention advantageously includes at least one first coloured effect formed by at least one printing of a composition incorporating at least one first photoluminescent pigment, and at least one second coloured effect formed by at least one printing of a composition incorporating at least one second photoluminescent pigment having an emission spectrum which is distinct from that of a first photoluminescent pigment forming a first coloured effect opposite this second coloured effect, the third corresponding coloured effect being produced by additive synthesis.

In the case of additive synthesis it is practically impossible to reproduce the second coloured effect with sufficient accuracy to obtain the third combined coloured effect. To do so would presuppose knowledge, firstly, of the exact nature of each pigment used, the emission spectrum of which is very narrow (a few nanometers), and, secondly, of their precise dosage.

According to the invention the coloured effects are advantageously invisible when illuminated by visible light (i.e. with all the light sources emitting only in the visible range) and are visible when illuminated by at least one source of invisible light. In other words, said predetermined light which enables the production of the first and second coloured effects—and therefore of the third coloured effect(s)—must include at least one source of invisible light (a visible light source may also be combined with such an invisible light source). "Visible light" refers to light the spectral composition of which is in the visible spectrum, from 0.4 μm to 0.8 μm; "invisible light" refers to light having a spectral composition located outside the visible spectrum, in particular in the ultraviolet and/or infrared spectrum.

In particular, the photoluminescent pigments used for the first and second coloured effects are selected to have an excitation spectrum in the invisible range. But their emission spectrum is within the visible range to permit detection of the third coloured effect(s) by simple perception by the human eye.

Moreover, the excitation spectra of the different pigments used may be identical or overlap, so that only a single source of light, visible or invisible, is necessary to form said predetermined light and to display each third coloured effect. As a variant, these excitation spectra may, on the contrary, be distinct, so that a plurality of distinct light sources are necessary to form said predetermined light. For example, at least some of the pigments (of a first coloured effect and/or of a second coloured effect) may be selected from photoluminescent pigments having an excitation spectrum within the infrared range, and others may be selected to have an excitation spectrum in the ultraviolet range (short ultraviolet and/or long ultraviolet). According to a possible embodiment, the excitation spectrum of the pigment(s) forming a first coloured effect is distinct from that of the pigment(s) forming a second coloured effect.

The brittle thickness must be at least partially transparent:

- to the component of said predetermined light which enables the production of each first coloured effect designed to form a third coloured effect (excitation source of the first coloured effect);
- to visible radiation emitted by this first coloured effect, such that said radiation can be emitted from the printing surface and can form a third coloured effect which is visible through combination with radiation emitted by a second coloured effect.

If the second, corresponding coloured effect is produced on the surface of the printing surface, the brittle thickness does not necessarily have to be transparent to the component of said predetermined light which enables the production (excitation source) of the second coloured effect, or to radiation emitted by said second coloured effect. Nevertheless, in the most frequent and advantageous case, in which at least one second coloured effect is produced within the brittle thickness (in particular, in the case of a pigment incorporated in said brittle thickness), the brittle thickness must also be at least partially transparent to the component of the light which enables the production of the second coloured effect, and to the corresponding radiation emitted.

According to the invention the brittle thickness is advantageously formed by at least one printing layer of a varnish composition produced on the front side of the core.

Throughout this text, "varnish" refers to any hardened solid composition resulting from a hardenable liquid composition; this term therefore includes conventional air-hardening varnishes, inks, lacquers, paints, resins, etc., and irreversibly-hardened compositions (based, for example, on thermoset resins) as well as reversibly-hardened compositions (based, for example, on thermoplastic materials).

According to the invention the brittle thickness is advantageously formed by at least one printing layer produced by screen process printing. According to the invention the brittle thickness advantageously has a thickness of between 5 μm and 25 μm—in particular, of the order of 15 μm.

According to the invention, at least one printing layer forming the brittle thickness is advantageously formed using a varnish having a non-reticulated, single-constituent acrylic base—in particular, in an aqueous solution hardenable by evaporation (drying)—designed to be able to receive variable entries produced by printing or writing and adhering to this brittle thickness with a strength greater than the mechanical cohesion of said brittle thickness.

More particularly, according to the invention the brittle thickness is advantageously formed by a single printing layer of a composition of single-constituent, flexible transparent varnish incorporating a proportion of solid filler of between 10 and 50 wt/% when in the liquid state before hardening, during the production of this printing. This significant proportion of solid filler enables the production, in particular, of a varnish layer having an intrinsic mechanical cohesion sufficiently low to cause it to be damaged when scratched or erased, but which is otherwise strong enough to be able to receive written or printed variable entries. In case of scratching with a blade or a fingernail or of erasure under heavy pressure, the brittle thickness becomes detached from the core. In the case of light erasure, at best the ink of the variable entries is spread to form an indelible smudge in the brittle thickness. This solid filler also has the effect of rendering the brittle thickness at least slightly opaque in visible light, thus forming a non-transparent printing background—in particular a generally light background—facilitating the production of variable entries and subsequent reading thereof. Thus, according to the invention the brittle thickness is advantageously sufficiently opaque when illuminated by visible light to form a background facilitating the printing and/or reading of the variable entries. Nevertheless, it must be at least partially transparent to enable coloured effects to be obtained by additive synthesis.

According to the invention the solid filler of the brittle thickness is advantageously composed principally of at least one pigment chosen from photoluminescent pigments (in invisible or visible light), iridescent pigments and pigments having variable optical effects according to the viewing direction, and performs the function of the second coloured effect. This second coloured effect is then a coloration effect of the brittle thickness by pigmentation.

In an advantageous embodiment according to the invention, the solid filler of the brittle thickness includes an iridescent blue pigment and a red pigment which is invisible in visible light and is photoluminescent red when illuminated by invisible light, in particular in ultraviolet radiation. The brittle thickness then has a generally light-coloured appearance in visible light, thus forming a light background for the printing surface which receives the variable entries, which can be produced with conventional black ink.

The brittle thickness must be produced in a shape corresponding at least to the zones designed to receive the variable entries.

According to the invention, the brittle thickness is advantageously formed by a continuous layer covering the core and having at least substantially the format of its front side.

A marker according to the invention is advantageously characterised in that at least one first coloured effect is formed by at least one printing produced on the side, called the verso or reverse side (hereinafter reverse side), of the core opposite the front or recto side, and in that the portion of the core between the front and reverse sides is at least partially transparent, at least to the component of said predetermined light which enables the production of said first coloured effect(s), and to the radiation emitted by said first coloured effect(s). In this way, said first coloured effect(s) is/are protected against attempted counterfeiting by the core itself. Nevertheless, there is no reason why there should not be provided, as a variant or in combination, at least one first coloured effect formed by a printing produced on the front side of the core and designed to be non-removable by scratching or erasing without causing visible and irreversible damage to the core. To achieve this, it is sufficient, for example, to use a printing composition which adheres sufficiently strongly to the core.

According to the invention the core advantageously includes a sheet of synthetic material which is transparent at least in visible light, and at least one printing produced on the reverse side of this core sheet and forming the first coloured effect.

According to the invention, the core sheet is advantageously made of transparent polyester. This material produces an excellent compromise which is adapted to receive printings—in particular by screen process printing—while providing good transparency, having characteristics of flexibility enabling it to be manipulated and passed through printers, and ensuring differential separability functions for the varnishes, in the manner of dry transfers (transfer process), which functions provide protection against attempted delamination, as explained below. It has a thickness of between 20 μm and 100 μm, in particular of the order of 50 μm.

According to the invention the marker is advantageously formed by successive screen printing processes on the core sheet, in particular on the polyester core sheet, on the front and reverse sides. The brittle thickness and the first coloured effect(s) are, in particular, layers of screen process printings.

A marker according to the invention advantageously includes at least one continuous printing incorporating at least one pigment and produced at least substantially in the format of the core on the reverse side of same, as a first coloured effect. As a variant or in combination, it includes at least one printing of at least one motif (printing on a portion of the surface and/or discontinuous printing) incorporating at least one pigment and produced on the reverse side of the core, as a first coloured effect. In the case of a combination of these embodiments, different pigments are used for the continuous printing and for the printing of motif(s).

In addition, according to the invention the marker advantageously includes at least one unprinted embrittlement zone formed—in particular on the reverse side of the core—as a cavity adjacent to at least one zone on which a printing forming a first coloured effect is produced. This unprinted embrittlement zone embrittles the printing zone of the first coloured effect, causing it to separate (delamination) in a plurality of parts, at least one of which remains associated with the marker while at least one other part remains associated with the support, in case of an attempt to unglue the marker from the support after marking.

In addition, according to the invention the marker advantageously includes an adhesive layer, opposite the printing surface, which is adapted and designed to enable it to be glued to a support to be marked. As a variant, the adhesive may be carried wholly or partly by the support itself. According to the invention the adhesive is advantageously an adhesive susceptible to cold pressing, i.e. at room temperature (self-adhesive).

In addition, according to the invention the marker advantageously includes at least one motif printed on the adhesive layer on the side of its surface designed to be applied to a support to be marked, or on the side facing the reverse side of the core in a corresponding reserved zone free of adhesive, this motif being formed by a coloured composition susceptible to attack by solvents (aqueous or non-aqueous; polar or non-polar), so as to reveal any attempt to unglue the marker by an attack using a solvent after it has been glued to a support to be marked. This motif may be produced, for example, with a printing composition as described in FR-2 675 742 and/or WO-00 71361, which is preferably visible when illuminated by visible light. It is produced preferably in a peripheral portion or in the vicinity of the periphery of the marker. This solvent-sensitive motif also embrittles the adhesive layer mechanically and may also cause its partial delamination in case of an attempt to unglue it after it has been glued to a support.

Likewise, according to the invention the marker advantageously shows common, preprinted markings on the printing surface which are visible in visible light.

A marker according to the invention advantageously has at least one photoluminescent motif preprinted on the printing surface and designed to be covered with variable entries. According to the invention, the preprinted photoluminescent motif is advantageously produced in a zone intended to receive an image and/or a design and/or a photograph as the variable entries. According to the invention the preprinted photoluminescent motif is advantageously produced using ink which is susceptible to attack by solvents—in particular, as described in FR-2 675 742 or WO-00 71361. According to the invention the preprinted photoluminescent motif is produced using an ink which is invisible when illuminated by visible light and is photoluminescent when illuminated by invisible light. This preprinted photoluminescent motif may be continuous (a spot) or, preferably, discontinuous.

When discontinuous, it is visible even when illuminated by visible light, through a lenticulation effect of the variable entries produced above this preprinted photoluminescent motif. This lenticulation effect is, in particular, clearly visible when the variable entries cover the totality of the preprinted motif, in particular when they are continuous in this zone (image, photograph, etc.).

According to the invention, the marker formed in this way is advantageously at least partially transparent to visible light (translucent or transparent) to enable motifs carried by the support to be displayed through its thickness.

The invention extends to a method for the use of a marker according to the invention. The invention therefore relates to a method for affixing variable entries to a support to be marked, whereby the variable entries are produced on a marker and this marker is then glued to the support to be marked, characterised in that an anti-counterfeiting marker according to the invention is used.

Although it is possible, after gluing the marker to the support, to cover said marker with a transparent protective security film, one of the advantages of the invention lies in the fact that, on the contrary, the use of such a film is unnecessary with the marker according to the invention. Thus, according to the invention the variable entries are advantageously left exposed to the air after being produced, without being covered. In particular they are not covered with a transparent protective film. As a result, the slightest mechanical aggression aiming to falsify the variable entries will irreversibly leave a visible trace. Nevertheless, the brittle thickness of a marker according to the invention is durable enough not to deteriorate prematurely over time as a result of simple normal handling.

According to the invention, the variable entries are advantageously produced by at least one method selected from: handwriting; writing by means of a typewriter; printing by means of a dot-matrix printer; printing by means of a colour or monochrome laser printer; printing by means of a dry ink transfer printer; gluing on of an image or photograph.

The invention also extends to a support marked with variable entries—notably a document, passport, identity card, driving license, vehicle licensing document or other official identification and/or authentication document—characterised in that it includes at least one anti-counterfeiting marker according to the invention glued to said support, on the printing surface of which marker variable entries are produced. According to the invention, the support is advantageously characterised in that the variable entries are left exposed to the air, not covered.

According to the invention the support is advantageously characterised in that the variable entries are produced by at least one method chosen from: handwriting; writing by means of a typewriter; printing by means of a dot-matrix printer; printing by means of a colour or monochrome laser printer; printing by means of a dry ink transfer printer; gluing on of an image or photograph.

The invention also relates to a marker, a method and a marked support characterised in combination by all or some of the characteristics mentioned above or below.

Other objects, characteristics and advantages of the invention will be apparent from the following description of a preferred embodiment, which is given solely as a non-limiting example and with reference to the appended drawings, in which:

For purposes of illustration the scale of the Figures showing sectional views is exaggeratedly enlarged in the direction of thickness.

DETAILED DESCRIPTION OF THE PREFERRED EMBODIMENT

Figure 1:
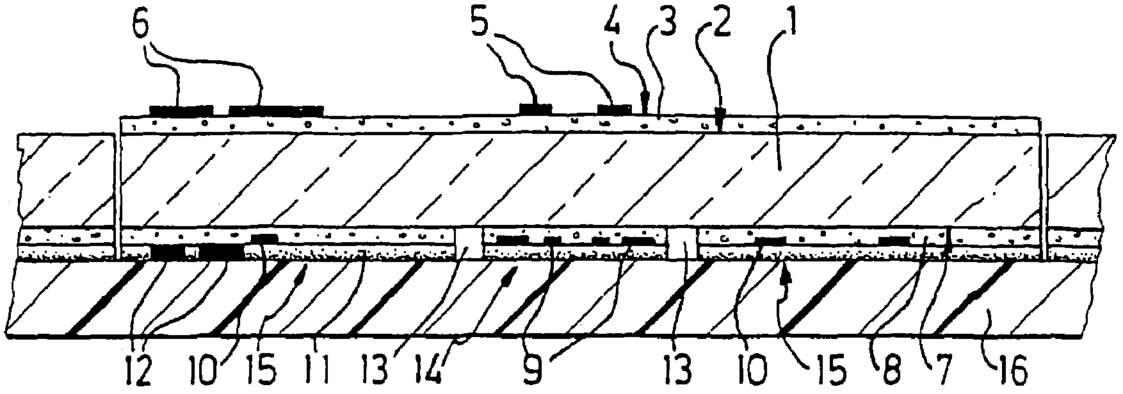
FIG. 1 is a schematic sectional view of an embodiment of a marker according to the invention.
Figure 2:
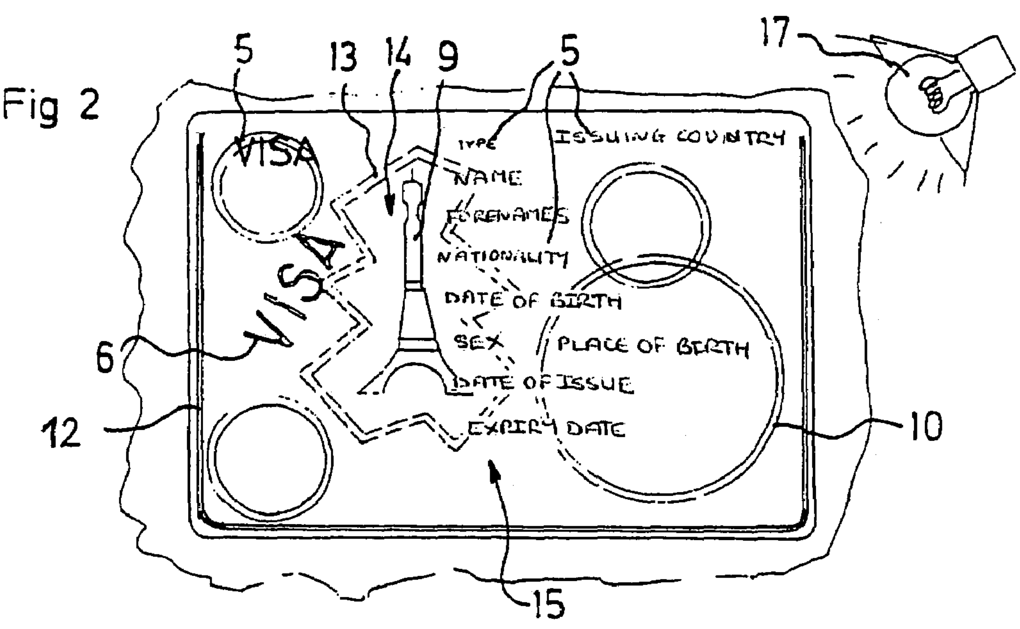
FIG. 2 is a schematic view of an example of a marker according to the invention seen from the front side while illuminated by invisible light.

The marker according to the invention shown in FIG. 1 includes a core 1 formed by a sheet of film of transparent synthetic material. Printed on the front side 2 of the core 1 is a brittle thickness 3 which, in the example shown, is formed by a continuous layer of varnish composition produced to have at least substantially the same format as the front side 2 of the core 1. This brittle thickness 3 has a free surface 4, called the printing surface 4, which allows the production of variable entries 19 which are visible when illuminated by visible light. However, this printing face 4 carries common markings 5 (for example, of the type identifying the variable entries subsequently printed or facilitating their production: definition of fields, guide lines, frame, etc.), which common markings 5 are preprinted using ordinary ink visible when illuminated by visible light and/or using solvent-sensitive ink (FR-2 675 742 and/or WO-00 71361). The printing surface 4 also shows at least one preprinted motif 6 in a zone intended to be covered with variable entries. This preprinted motif 6 is printed using an ink susceptible to attack by solvents (FR-2 675 742 and/or WO-00 71361) and which is preferably invisible when illuminated by visible light and photoluminescent when illuminated by invisible light—in particular by ultraviolet light. This preprinted photoluminescent motif 6 may be a continuous motif, for example, forming a background for a photograph, or a discontinuous motif as shown in FIG. 2 in the form of a "VISA" text which is then covered with variable entries 19, in particular a printed photograph 19*b*. The printing of a photograph 19*b* or other variable entry 19 over such a discontinuous preprinted photoluminescent motif 6 permits, firstly, the creation of a degree of lenticulation which is visible when illuminated by visible light and demonstrates at first sight the authentic nature of the variable entries 19*b* concerned and, secondly, the verification of this authentic character under illumination by invisible light.

On its reverse side 7 the core 1 includes a layer 8 of varnish, motifs 9, 10 printed on said varnish layer 8, a layer 11 of an adhesive composition—in particular an adhesive susceptible to cold-pressing, at least one motif 12 printed on the adhesive layer (if the latter is compatible with subsequent printing, i.e. does not provide instantaneous initial adherence, e.g. if a thermoreactive adhesive is used), or printed in a reserved zone formed throughout the thickness of the adhesive layer 11 (if a self-adhesive composition is used), said printed motif 12 being produced using an ink sensitive to solvent attacks (FR-2 675 742 and/or WO-00 71361) and preferably visible in visible light, and being located at least in the vicinity of the periphery of the marker, in order to reveal any attempt to attack the adhesive 11 with solvents.

In addition, at least one motif, called the reserve motif 13, is produced by a reserved zone formed as a cavity through the varnish layer 8 as far as the core 1. This reserve motif 13 may be formed solely in the thickness of the varnish layer 8 and through the adhesive layer 11.

Preferably, this reserve motif 13 is of the closed type, i.e. it defines a central zone 14 separated from a zone 15 outside said reserve motif 13. Apart from the presence of at least one reserve motif 13 of this type, the varnish layer 8 is continuous. The motifs 9, 10 printed on the varnish layer 8 preferably include at least one motif 9 printed on the central zone 14, and at least one motif 10 printed on the zone 15 outside the reserve motif 13.

The adhesive layer 11 is covered with a siliconised non-stick paper 16.

The synthetic material forming the core 1 is preferably a transparent polyester film the thickness of which may be, for example, of the order of 35 μm or 50 μm, which represents a material which is easily printable by screen process printing and is adapted to receive varnish compositions which may subsequently separate therefrom in the manner of a transfer. In addition, this material resists scratching and erasing and constitutes an appropriate base for the formation of the brittle thickness 3, which itself does not resist scratching or erasing. This core 1 may itself incorporate a pigment (in particular, a fluorescent whitening agent) which forms a first coloured effect, which is invisible when illuminated by visible light and visible when illuminated by invisible light—in particular, in ultraviolet light. Nevertheless, the core 1 preferably contains only a small amount of pigment or none, in particular a quantity of fluorescent whitening agent small enough to produce only a negligible effect.

The layer of brittle thickness 3 is produced from a flexible single-constituent, non-reticulated varnish composition, in particular a single-constituent acrylic-based varnish composition in an aqueous solution hardenable by evaporation (drying).

This layer 3 is printed using screen process printing and incorporates, firstly, a pigment iridescent in visible light which forms an iridescent effect 20 (represented by dots in FIG. 3) and, secondly, a pigment invisible when illuminated by visible light and visible when illuminated by invisible light, in particular ultraviolet light. For example, the printing composition used to produce the brittle thickness 3 is as follows:

flexible varnish, reference 3×8898 (TIFLEX, FRANCE): 100 parts (by weight), iridescent blue pigment iriodine 225 Rutil Pear Blue® (MERCK, FRANCE): 6 parts (by weight), Lumilux Red pigment CD105® (Honeywell, GERMANY): 12 parts (by weight).

The iridescent pigment and the photoluminescent pigment which is red in ultraviolet light form a solid filler for the printing composition which contributes to its subsequent brittleness when scratched. In addition, the photoluminescent pigment incorporated in this brittle thickness 3 produces a coloured effect, called the second coloured effect 22, which is invisible in visible light and visible in invisible light—in particular in ultraviolet light. In the example illustrated, the excitation wavelength of the pigment is 365 nm and its peak emission wavelength is 620 nm.

The brittle thickness 3 is produced by screen process printing using a screen of 51 threads/cm and photopolymeric coating, so that it has a thickness which is less than that of the core 1 and, in this example, is of the order of 15 μm. Advantageously, this thickness may vary between 5 μm and 25 μm.

Such a brittle thickness 3 can readily receive every kind of printed or handwritten variable entry 19, which will adhere strongly to this brittle thickness 3, i.e. to its printing surface 4. However, at the slightest attempt to attack said variable entries mechanically by scratching or heavy erasing, the brittle thickness 3 immediately becomes detached from the core 1, leaving a hollow 24 (FIG. 6) in the brittle thickness 3. In this hollow 24 the front face of the core 1 is immediately seen, together with the absence of the iridescent pigment and photoluminescent pigment of the brittle thickness 3. In case of light erasing the variable entries 19 are spread in the brittle thickness 3, leaving an indelible trace.

The separation force measured by the standardised test method FINAT No. 1 (FTM1) of the brittle thickness 3 on the polyester forming the core 1 is of the order of 1500 mN±200 mN/25 mm.

For example, the following composition may be used to produce the varnish layer 8:

acrylic varnish with UV drying, reference 3×4708 (TIFLEX, FRANCE); 100 parts (by weight), adhesion promoter, reference 3×4970 (TIFLEX, FRANCE): 2 parts (by weight).

The varnish layer 8 is selected to remain associated with the core 1 in case of normal handling, but to become easily separated therefrom in case of fraudulent attempts to unglue the marking after it has been glued to a support to be protected.

In the case of the varnish composition 8 there is obtained a separation force measured by the standardised test method FINAT No. 1 (FTM1) on the transparent polyester forming the core 1 which is of the order of 100 mN±10 mN/25 mm.

The printed motifs 9, 10 are likewise produced from varnish composition incorporating photoluminescent pigments which are distinct from those of the brittle thickness 3, i.e. they have a different peak emission. For example the printed motif 9 is produced with a pigment having an emission peak at 530 nm (green) and a printed motif 10 is produced with a photoluminescent pigment having an emission peak at 440 nm (blue).

For example, the following varnish compositions are used to produce the printed motifs 9, 10:

motif 9:

ink, invisible when illuminated with visible light and fluorescent in ultraviolet light, green, reference 3×7951 (TIFLEX, FRANCE): 50 parts (by weight);

cutting base, reference 3×4708 (TIFLEX, FRANCE): 50 parts (by weight);

motif 10:

ink, invisible when illuminated by visible light and fluorescent in ultraviolet light, soluble blue, reference 3×9116 (TIFLEX, FRANCE): 70 parts (by weight), soluble cutting base, reference LG010710/1 (TIFLEX, FRANCE): 30 parts (by weight), retarder, reference LG010710/2 (TIFLEX, FRANCE): 15 parts (by weight).

The different pigments used, which are incorporated in the inks, have an identical excitation wavelength at 365 nm, so that a single source of invisible light 17 is useful and necessary to display the coloured effect, called the first coloured effect 21, formed thereby. On the front side of the marker, therefore, there is displayed (FIG. 6), under illumination with a source 17 of ultraviolet radiation, a third coloured effect 23 produced by additive synthesis, through combination of a second coloured effect 22 emanating from the pigment of the brittle thickness 3 with the first coloured effect 21 emanating from the printed motifs 9, 10 and, if applicable, the varnish layer 8 and/or the core 1. In the example illustrated, if the varnish layer 8 is transparent and only the printed motifs 9, 10 are pigmented, the third coloured effect 23 will consist of a precise colour for each of the printed motifs 9, 10 visible on the front side of the marker. With the pigments indicated above as examples, the coloured effects are as follows:

motif 9 green and brittle thickness 3 red: third coloured effect yellow in ultraviolet light;

motif 10 blue and brittle thickness 3 red: third coloured effect violet in ultraviolet light;

reserve motif 13: visible red in ultraviolet light (colour of the brittle thickness 3, the effect of the fluorescent whitening agent of the core 1 being negligible).

Figure 6:
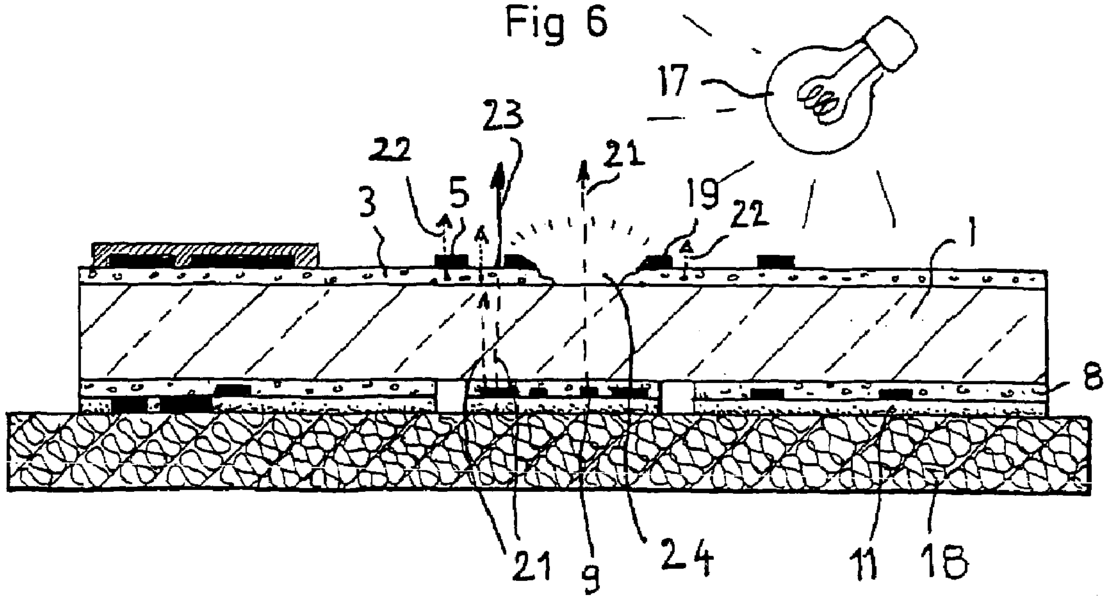
FIG. 6 is a schematic sectional view similar to FIG. 3, showing the result of an attempt to scratch off the variable entries.

If the brittle thickness 3 disappears on a particular zone, this third coloured effect 23 also disappears locally, only the first coloured effect remaining visible, as illustrated in FIG. 6.

It should be noted, however, that other, more complex variants can be produced. In particular, it is possible to produce, within the brittle thickness 3 itself, a predetermined motif having one or two predetermined pigment(s), one or the other of which forms a monochrome component of a trichromatic image, at least one other component of which is produced on the reverse side of the core 1, on the side of the varnish layer 8. Thus, the third coloured effect produced may be a photoluminescent polychromatic image as described, for example, by WO-0024587.

The varnish layer 8 printed on the reverse side of the core 1 may also incorporate a photoluminescent pigment distinct from that used in the brittle thickness 3.

For example, if the varnish layer 8 on the reverse side of the core 1 incorporates a pigment 2205 (USR, USA) the excitation wavelength of which is at 365 nm and the emission wavelength of which is in the blue range, the coloured effects are as follows:

motif 9 green, varnish 8 blue, brittle thickness 3 red: third coloured effect white in ultraviolet light;

motif 10 blue, varnish 8 blue, brittle thickness 3 red: third coloured effect dark violet in ultraviolet light;

varnish 8 and brittle thickness 3 red: third coloured effect light violet in ultraviolet light;

reserve motif 13: visible red in ultraviolet light.

In another variant of the invention the different pigments used may be stimulated not by the same source 17 of invisible light, but by different sources. For example, a pigment which is photoluminescent in short ultraviolet light may be selected for the brittle thickness 3, a pigment which is photoluminescent in long ultraviolet light for a printed motif 9 and a pigment which is photoluminescent in infrared light for another printed motif 10. Any other combination or variant is also possible.

It should also be noted that opposite the reserve motif 13 formed in the layers 8, 11 of varnish and adhesive, on the front side only the pigment of the brittle thickness 3 is seen, which, in the example mentioned above, is the red photoluminescent pigment, i.e. the second coloured effect (and not a third coloured effect 23).

In the example illustrated in FIG. 2, the printed motif 9 is a graphic representation of the Eiffel Tower and the printed motif 10 is formed by circles. The photoluminescent motif 6 preprinted on the printing surface 4 is constituted by the text "VISA". The reserve motif 13 surrounds the printed motif 9 along a broken line. Motif 12 produced with solvent-sensitive ink is a continuous line or is formed by text, at the periphery of the marker.

Figure 3:
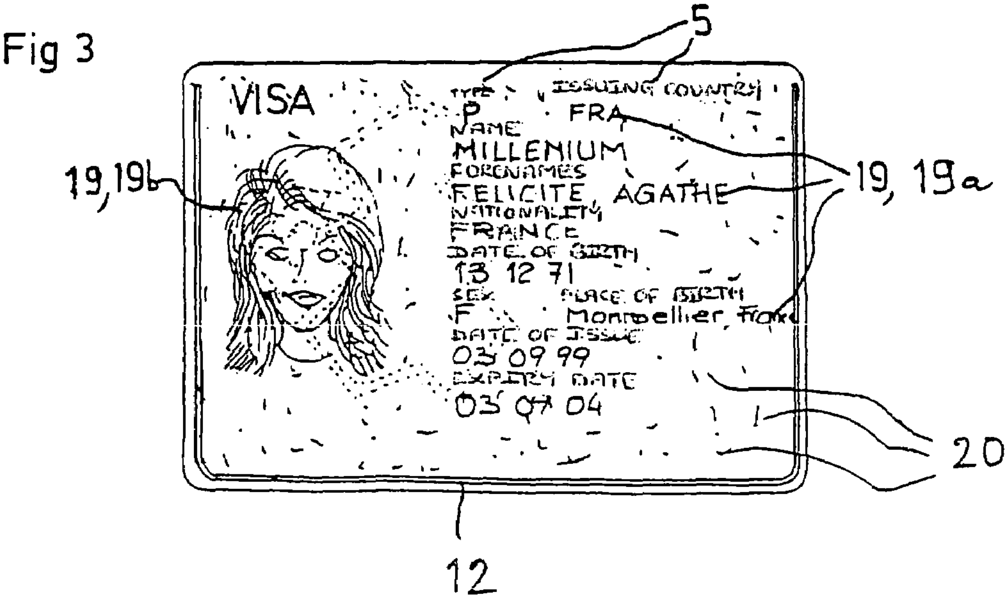
FIG. 3 is a view similar to FIG. 2, the marker being shown after the production of variable entries and while illuminated by visible light.
Figure 4:
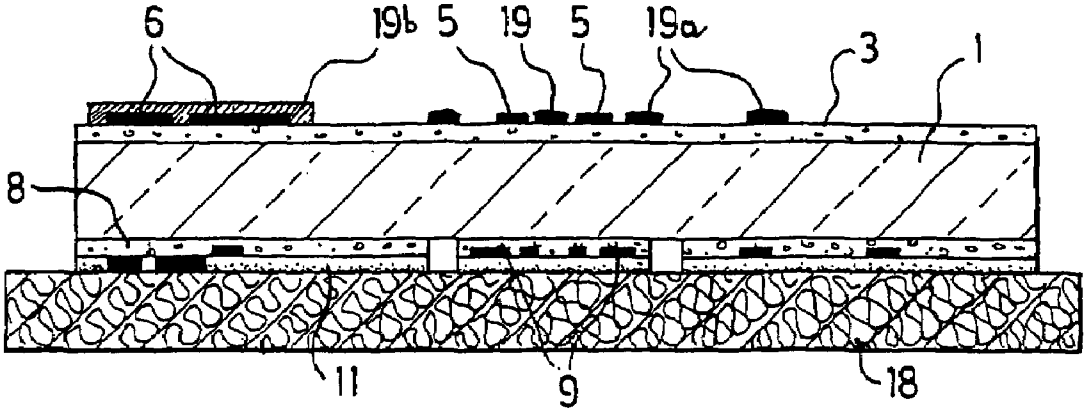
FIG. 4 is a schematic sectional view representing a marker according to the invention carrying variable entries and associated with a support to be marked.

As can be seen in FIG. 3, such a marker may enable the production of visas. The photograph 19*b* is printed over the preprinted photoluminescent motif 6. Variable entries 19*a* are also printed in the fields corresponding to name, address, etc., on the printing surface 4. The marker is then separated from the non-stick paper 16 and then glued to a support 18 as shown in FIG. 4. The variable entries 19 thus produced are preferably left exposed to the air, i.e. are not covered with a security film.

Figure 5:
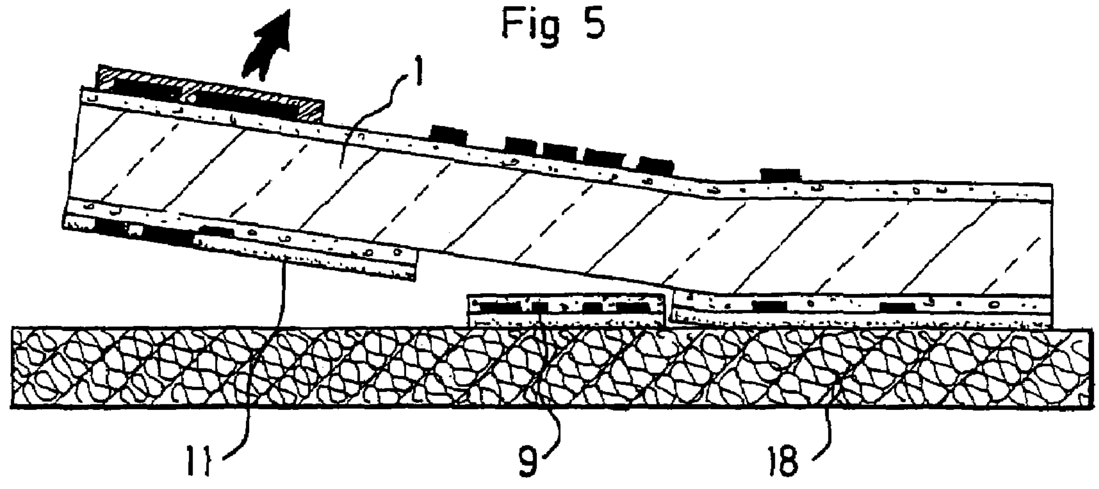
FIG. 5 is a schematic sectional view similar to FIG. 3, showing an attempt to unglue the marker.

In case of a mechanical attack on the variable entries 19, the brittle thickness 3 becomes detached from the core 1 and the third coloured effect 23 is locally no longer visible. In addition, the front face 2 of the core 1 is visible and shows a characteristic appearance (rendered luminescent and bluish by the fluorescent whitening agent of the core 1 and/or coloured by the pigment of the varnish layer 8). In case of an attempt to unglue the marker from the support 18 (FIG. 5), layers 8, 11 are delaminated. The printed motif 9 surrounded by reserve zone 13 remains associated with the support 18, while the outer zone 15 and the printed motif 10 peel off with the marker. In practice, the solvent-sensitive peripheral motif 12 also causes a degree of delamination of the adhesive 11 (not shown in FIG. 5). The marker is then destroyed and cannot be reconstituted.

If a forger attempts to reconstitute the brittle thickness 3 after its destruction he will nevertheless be unable to reproduce the third coloured effect 23 exactly. Indeed, such reproduction would require knowledge not only of the exact nature of the pigments, but also of the dosage of the printing composition and the methods for implementing this printing process intended to fill the hollow 24.

Thus, the marker according to the invention provides a high degree of protection against counterfeiting, and does so at lower cost for manufacture and use.

Manufacture of the marker according to the invention may start from a polyester film forming the core 1 on which the varnish layers 8, the printings of motifs 9, 10, 12 and the reserve motif 13 are first produced, and the assembly is then associated with a siliconised non-stick paper 16. The markers are then cut out of the complex thus produced according to desired formats by a half-depth cut (FIG. 1). The brittle thickness 3 is then produced on each marker, followed by the preprinted photoluminescent motifs 6 and the common entries 5.

Markers can therefore be produced in series, in sheets or even continuously, by means of successive screen printing processes on both sides of the polyester film forming the core 1.

The invention may be the subject of numerous variants in relation to the examples described and illustrated. For example, the brittle thickness 3 may be formed from a plurality of successive layers of identical or similar compositions. It should be noted that the filler incorporated in the brittle thickness 3 renders same at least partially opaque and forms a background, which is generally light-coloured and is visible in visible light, which facilitates the writing but above all the reading of the variable entries 19. Types of solid filler other than iridescent or photoluminescent pigments may be incorporated in the brittle thickness 3. In particular, fillers which are neutral with respect to luminous effects but which impart to the brittle thickness 3 desired mechanical characteristics, in particular with regard to fragility when scratched and/or erased, may also be incorporated. For example, a metallic powder or paste providing a layer susceptible to being scratched off (such as those well known under the designation "SCRATCH-OFF" and used to mask information) may be incorporated.

The invention may also be the subject of numerous different applications in which it will confer the same advantages. Thus, it can enable numerous objects or documents to be marked permanently or temporarily with variable entries, without the possibility of subsequent falsification of these variable entries.

The invention claimed is:

1. An anti-counterfeiting marker for producing variable entries (19) and affixing same to a support (18) to be marked, while preventing their falsification, comprising:

a core (1) in the form of a sheet having at least one coloured effect, called the first coloured effect (21) which is visible on at least one side, called the front side (2), at least when illuminated by predetermined light, and is adapted to be non-removable by scratching or erasing on the front side of the core (1) without causing visible and irreversible damage to the core (1), a thickness, called the brittle thickness (3), covering at least a part of the core (1) on the front side, said brittle thickness (3):

presenting a free surface, called the printing surface (4), suitable and designed to receive variable entries (19), said brittle thickness (3) being adapted to allow such variable entries (19) to be produced on the printing surface (4) without being damaged or becoming detached from the core (1);

being adapted to be damaged and to become detached from the core (1) under the effect of scratching or erasing intended to falsify the variable entries (19);

including, at least opposite at least one subjacent first coloured effect (21), at least one coloured effect, called the second coloured effect (22), which is visible on the printing surface (4) at least when illuminated by said predetermined light and is adapted to produce a third coloured effect (23) distinct from the first (21) and second (22) coloured effects by combining with the first coloured effect (21), and being at least partially transparent, at least when illuminated by said predetermined light, to at least each component of said predetermined light which enables the production of each first coloured effect (21) and of each second coloured effect (22) produced below the printing surface (4), and to radiation emitted by said coloured effects (21, 22), in order to enable each third coloured effect (23) to be displayed.

2. A marker as claimed in claim 1, wherein it includes at least one first coloured effect (21) formed by at least one printing of a composition incorporating at least one first photoluminescent pigment, and at least one second coloured effect (22) formed by at least one printing of a composition incorporating at least one second photoluminescent pigment having an emission spectrum which is distinct from that of a first photoluminescent pigment forming a first coloured effect (21) opposite said second coloured effect (22), the corresponding third coloured effect (23) being produced by additive synthesis.

3. A marker as claimed in claim 1, wherein the coloured effects (21, 22, 23) are invisible in visible light and visible when illuminated by at least one source (17) of invisible light.

4. A marker as claimed in claim 1, wherein the brittle thickness (3) is formed by at least one printing layer of a varnish composition produced on the front side (2) of the core (1).

5. A marker as claimed in claim 4, wherein the brittle thickness (3) is formed by a single printing layer of a flexible transparent single-constituent varnish composition incorporating a proportion of solid filler of between 10 and 50 wt/% when in the liquid state before hardening.

6. A marker as claimed in claim 5, wherein the solid filler of the brittle thickness (3) is formed principally by at least one pigment selected from pigments which are photoluminescent in invisible or visible light, iridescent pigments and pigments having variable optical effects according to the viewing direction, and performs the function of the second coloured effect (22).

7. A marker as claimed in claim 6, wherein the solid filler of the brittle thickness (3) includes an iridescent blue pigment and a red pigment which is invisible in visible light and photoluminescent red when illuminated by invisible light.

8. A marker as claimed in claim 7, wherein the brittle thickness (3) is formed using a single-constituent non-reticulated acrylic-based varnish adapted to receive variable entries (19) produced by printing or writing and adhering to said brittle thickness (3) with a strength greater than the mechanical cohesion of said brittle thickness (3).

9. A marker as claimed in claim 1, wherein the brittle thickness (3) is formed by a continuous layer covering the core (1) and having at least substantially the format of the front side (2) of the core (1).

10. A marker as claimed in claim 1, wherein the brittle thickness (3) is sufficiently opaque when illuminated by visible light to form a background facilitating the printing of variable entries (19) and/or the reading of same.

11. A marker as claimed in claim 1, wherein the brittle thickness (3) has a thickness of between 5 μm and 25 μm, in particular of the order of 15 μm.

12. A marker as claimed in claim 1, wherein at least one first coloured effect (21) is formed by at least one printing (8; 9, 10) produced on the side, called the reverse side (7), of the core (1) opposite the front side (2), and in that the portion of the core (1) contained between the front side (2) and the reverse side (7) is at least partially transparent, at least to the component of said predetermined light which enables the production of said first coloured effect(s) (21), and to the radiation emitted by said first coloured effect(s) (21).

13. A marker as claimed in claim 12, wherein the core (1) includes a sheet of transparent synthetic material and at least one printing (8, 9, 10) produced on the reverse side (7) of this core sheet (1) and forming the first coloured effect (21).

14. A marker as claimed in claim 13, wherein the core sheet (1) is of polyester.

15. A marker as claimed in claim 13, wherein the core sheet (1) has a thickness of between 20 μm and 100 μm, in particular of the order of 50 μm.

16. A marker as claimed in claim 13, wherein it is formed by successive screen printing processes on the core sheet (1), on the front (2) and on the reverse (7) sides of same.

17. A marker as claimed in claim 12, wherein it includes at least one continuous printing (8) incorporating at least one pigment and produced to have at least substantially the format of the core (1), on the reverse side (7) of same, as the first coloured effect (21).

18. A marker as claimed in claim 12, wherein it includes at least one printing of at least one printed motif (9, 10) incorporating at least one pigment and produced on the reverse side (7) of the core (1), as the first coloured effect (21).

19. A marker as claimed in claim 1, wherein it includes at least one unprinted embrittlement zone (13) formed as a cavity adjacent to at least one zone (14, 15) in which a printing (9, 10) forming a first coloured effect (21) is produced.

20. A marker as claimed in claim 1, wherein it includes a layer (11) of adhesive opposite to the printing surface (4) and suitable and designed to allow said marker to be glued to a support (18) to be marked.

21. A marker as claimed in claim 20, wherein the adhesive layer (11) is formed by an adhesive susceptible to cold pressing.

22. A marker as claimed in claim 20, wherein it includes at least one motif (12) printed on the adhesive layer (11) on the side of its surface designed to be applied to a support (18) to be marked, or facing the reverse side (7) of the core (1) in a corresponding reserved zone free of adhesive, said motif (12) being formed by a coloured composition susceptible to attack by solvents, so as to be able to reveal any attempt to unglue the marker by an attack using a solvent after it has been glued to a support (18) to be marked.

23. A marker as claimed in claim 1, wherein it has common entries (5) preprinted on the printing face (4) which are visible in visible light.

24. A marker as claimed in claim 1, wherein it has at least one preprinted photoluminescent motif (6) located on the printing surface (4) and designed to be covered with variable entries (19).

25. A marker as claimed in claim 24, wherein the preprinted photoluminescent motif (6) is produced in a zone designed to receive an image and/or a design and/or a photograph (19*b*) as variable entries (19).

26. A marker as claimed in claim 24, wherein the preprinted photoluminescent motif (6) is produced using ink which is susceptible to attack by solvents.

27. A marker as claimed in claim 24, wherein the preprinted photoluminescent motif (6) is produced using an ink which is invisible in visible light and photoluminescent when illuminated with invisible light.

28. A method for affixing variable entries (19) on a support (18) to be marked whereby the variable entries (19) are produced on a marker and said marker is then glued to the support (18) to be marked, wherein an anti-counterfeiting marker according to claim 1 is used.

29. A method as claimed in claim 28, wherein the variable entries (19) are then left exposed to the air, without being covered.

30. A method as claimed in claim 28, wherein the variable entries (19) are produced by at least one method selected from:

handwriting;
writing by means of a typewriter;
printing by means of a dot-matrix printer;
printing by means of a colour or monochrome laser printer;
printing by means of a dry ink transfer printer;
gluing on of an image or photograph.

31. A support marked with variable entries—in particular a document, passport, identity card, driving license, vehicle licensing document, or other official identification and/or authentication documents—wherein it includes at least one anti-counterfeiting marker as claimed in claim 1 which is glued to said support (18) and on the printing surface (4) of which the variable entries (19) are produced.

32. A support as claimed in claim 31, wherein the variable entries (19) are left exposed to the air, not covered.

33. A support as claimed in claim 31, wherein the variable entries (19) are produced by at least one method selected from:

handwriting;
writing by means of a typewriter;
printing by means of a dot-matrix printer;
printing by means of a colour or monochrome laser printer;
printing by means of a dry ink transfer printer;
gluing on of an image or photograph.

* * * * *